US010617595B2

(12) United States Patent
Martell et al.

(10) Patent No.: US 10,617,595 B2
(45) Date of Patent: Apr. 14, 2020

(54) TISSUE MASSAGER

(71) Applicants: Steffan Martell, Las Vegas, NV (US);
Genoa Martell, Las Vegas, NV (US)

(72) Inventors: Steffan Martell, Las Vegas, NV (US);
Genoa Martell, Las Vegas, NV (US)

( * ) Notice: Subject to any disclaimer, the term of this patent is extended or adjusted under 35 U.S.C. 154(b) by 321 days.

(21) Appl. No.: 15/558,767

(22) PCT Filed: Aug. 31, 2017

(86) PCT No.: PCT/US2017/049658
§ 371 (c)(1),
(2) Date: Sep. 15, 2017

(87) PCT Pub. No.: WO2018/045194
PCT Pub. Date: Mar. 8, 2018

(65) Prior Publication Data
US 2018/0243159 A1 Aug. 30, 2018

Related U.S. Application Data

(60) Provisional application No. 62/382,204, filed on Aug. 31, 2016.

(51) Int. Cl.
*A61H 13/00* (2006.01)
*A61H 23/02* (2006.01)
(Continued)

(52) U.S. Cl.
CPC ........... *A61H 13/00* (2013.01); *A61C 17/222* (2013.01); *A61H 19/00* (2013.01); *A61H 21/00* (2013.01); *A61H 23/00* (2013.01); *A61H 23/02* (2013.01); *A61H 23/0245* (2013.01); *A61C 17/20* (2013.01); *A61C 17/32* (2013.01);
(Continued)

(58) Field of Classification Search
CPC ........ A61H 19/00; A61H 19/30; A61H 19/34; A61H 19/40; A61H 19/44; A61H 19/50; A61H 21/00; A61H 13/00; A61H 23/00; A61H 23/02; A61H 23/0245; A61H 23/0254; A61H 23/0263; A61H 2201/01; A61H 2201/0107; A61H 2201/0111; A61H 2201/0157; A61H 2201/0165; A61H 2201/0169; A61H 2201/12; A61H 2201/0153; A61H 2205/085;
(Continued)

(56) References Cited

U.S. PATENT DOCUMENTS 7,186,226 B2 * 3/2007 Woolley ................. A61H 7/005
601/137
8,782,841 B2 * 7/2014 Sale ...................... A61C 17/222
15/22.1

(Continued)

*Primary Examiner* — Colin W Stuart
(74) *Attorney, Agent, or Firm* — Christopher Pilling

(57) ABSTRACT

A head unit configured to couple to a handle of an electric toothbrush, wherein the handle generates vibrational energy transferred to the head unit, the head unit comprising a proximal end and a distal end; a base adjacent to the proximal end, an exterior wall extending from the proximal end to the distal end, wherein the exterior encases a plurality of hollow chambers, wherein each of the plurality of hollow chambers are separated by a scaffold, wherein the scaffold connects to the exterior wall; and a bulb having an exterior surface configured to transfer the vibrational energy to an object.

11 Claims, 17 Drawing Sheets

(51) Int. Cl.
*A61H 21/00* (2006.01)
*A61H 19/00* (2006.01)
*A61H 23/00* (2006.01)
*A61C 17/22* (2006.01)
*A61C 17/20* (2006.01)
*A61C 17/32* (2006.01)

(52) U.S. Cl.
CPC ............... *A61H 2201/0107* (2013.01); *A61H 2201/0111* (2013.01); *A61H 2201/0153* (2013.01); *A61H 2201/0157* (2013.01); *A61H 2201/0165* (2013.01); *A61H 2201/0169* (2013.01); *A61H 2201/1215* (2013.01); *A61H 2201/1635* (2013.01)

(58) Field of Classification Search
CPC ........ A61H 2205/086; A61H 2205/087; A61C 17/20; A61C 17/32; A61C 17/222
USPC ......................................................... 601/46
See application file for complete search history.

(56) References Cited

U.S. PATENT DOCUMENTS

2007/0244418 A1* 10/2007 Harkness ............... A61H 19/44
                                                        601/72
2008/0221387 A1*  9/2008 Gaboury ................ A46B 13/02
                                                        600/38
2014/0336012 A1* 11/2014 Gourineni ............ A61H 1/0266
                                                        482/79

* cited by examiner

TISSUE MASSAGER

CROSS-REFERENCE TO RELATED APPLICATIONS

The present application claims priority to U.S. Provisional Application Ser. No. 62/382,204, filed on Aug. 31, 2016 entitled "Tissue Massager", the disclosure of which is hereby incorporated in its entirety at least by reference.

TECHNICAL FIELD

The present invention relates generally to vibrating devices, more particularly to a tissue massager for the massaging and stimulation of living tissue.

BACKGROUND ART

Many different vibrating devices exist in the art, mostly hand-held devices that can be used to massage tissue to provide a pleasurable effect for the recipient. Most vibrating devices comprise a motor that generates sonic or ultrasonic vibration, and a massage head which receives the sonic or ultrasonic vibration from the motor and transfers vibrational energy to a surface in contact with massage head, such as tissue that is put into contact with the massage head.

SUMMARY OF INVENTION

Briefly stated, the present disclosure is directed to a hand-held vibrating device, useful e.g., as a tissue massager, which embodiment may also be referred to as a massaging device or a tissue massager. The tissue massager of the present invention comprises two parts, i.e., contains at least two parts: a part that is held against the skin and provides the massage effect, where this part may also be referred to as the massager or massage head or massage unit, and a part that imparts a vibration to the massage head. The part which imparts a vibration may be designed to be held by a person using the massager, and so this part will be referred to herein as the handle or handle unit, or sometimes as the power base. The handle unit and head unit are designed to be joined physically together, so that the vibration generated within the handle is transferred to the head unit and then to the person or object that is in contact with the head unit, e.g., the person receiving the massage. The handle and head unit are also designed so that the handle may be separated from the head unit in order that a different head unit, e.g., a massage head of a different shape or a replacement massage head, may be attached or coupled to the handle. Thus, the present disclosure provides a vibrating device, such as a vibrating massaging device comprising a handle unit and a head unit, e.g., a massager unit, where the two units (or components) are readily coupled and decoupled from one another, although remain securely coupled together when the device is in use, and a vibration created within the handle is transferred to the head unit when the two components are coupled together and the motor is activated, typically by pressing a "on" switch. The present disclosure also provides various different head units, e.g., different message heads suitable for various uses of the massaging device.

Handles useful in the vibrating device of the present disclosure have been described, often in the context of a sonic or ultrasonic toothbrush. See, e.g., patent publications KR 2011 0028604 (published 21 Mar. 2011); JP 2009 247800 (published 29 Oct. 2009); CN 203291057 (published 20 Nov. 2013); CN 102755000 (published 31 Oct. 2012); CN 201346533 (describing a piezoelectric ceramic transducer, published 21 Mar. 2011) and US U.S. Pat. No. 7,849,548 (published 14 Dec. 2010). The present vibrating device makes use of a handle that generates sonic vibration in the frequency range of 25 k-35 k cycles/minute, or 28 k-32 k cycles/minute. These handles have not, however, been descried in combination with a head unit, e.g., a messaging head unit of the present disclosure.

A handle unit that operates at a frequency of 25 k-35 k cycles/minute imposes certain limitations on the head unit. When the head unit is solid, i.e., has no air space within it, then the head unit may be too heavy to function effectively as part of a stable hand-held tool. Also, when the head unit had a large single hollow internal cavity, without any protrusions from the exterior wall entering into the interior space, then the head unit may emit an undesirably loud noise. To reduce or eliminate this noise, and to achieve a desirable mass of the head unit, the head units of one embodiment of the present disclosure contain internal walls which function as baffles, i.e., features that restrain the flow of a gas to prevent the spreading of sound in an outward direction. In one aspect, those baffles extend from the interior wall of the head unit into the interior of the head unit. In another aspect, the baffles take the form of a scaffold that runs throughout the interior of the massage head, so that the massage head comprises a plurality of hollow chambers. In another aspect, the internal wall separates the head unit into two internal cavities. In other aspects, internal walls present within the head unit create two, or three, or four, or five or six distinct internal cavities.

Handles designed for use in conjunction with brush heads, i.e., handles useful for sonic or ultrasonic toothbrushes, typically include a coupling or fitting mechanism by which the brush (also sometimes called a brush head) may be attached to, or coupled with/to, the head or distal end of the handle. When it is desired, according to the present disclosure, that such a handle is fitted with a massage head rather than a head that contains brushes, the coupling between the handle and the head unit must be rather sturdy. In contrast, the coupling between the handle and a brush head for oral hygiene need not be as sturdy as is required when a massage head is fitted to the handle. The present disclosure provides a coupler that may be used to join together the handle of a sonic or ultrasonic toothbrush and the base of the head unit such as a massage head, an embodiment of which is illustrated in selected Figures provided herein.

DESCRIPTION OF EMBODIMENTS

The present invention may be understood more readily by reference to the following detailed description of the preferred embodiments of the invention and the examples included herein. It is to be understood that the terminology used herein is for the purpose of describing specific embodiments only and is not intended to be limiting. It is further to be understood that unless specifically defined herein, the terminology used herein is to be given its traditional meaning as known in the relevant art. Any headings used within this document are only being utilized to expedite its review by the reader, and should not be construed as limiting the invention or claims in any manner.

As used throughout this document, including the claims, the singular form "a", "an", and "the" include plural references unless indicated otherwise either explicitly or implicitly. For example, "a" hollow chamber includes one or more hollow chambers.

The details of one or more embodiments of the present disclosure may be further understood by reference to the attached drawings.

Figure 1A:
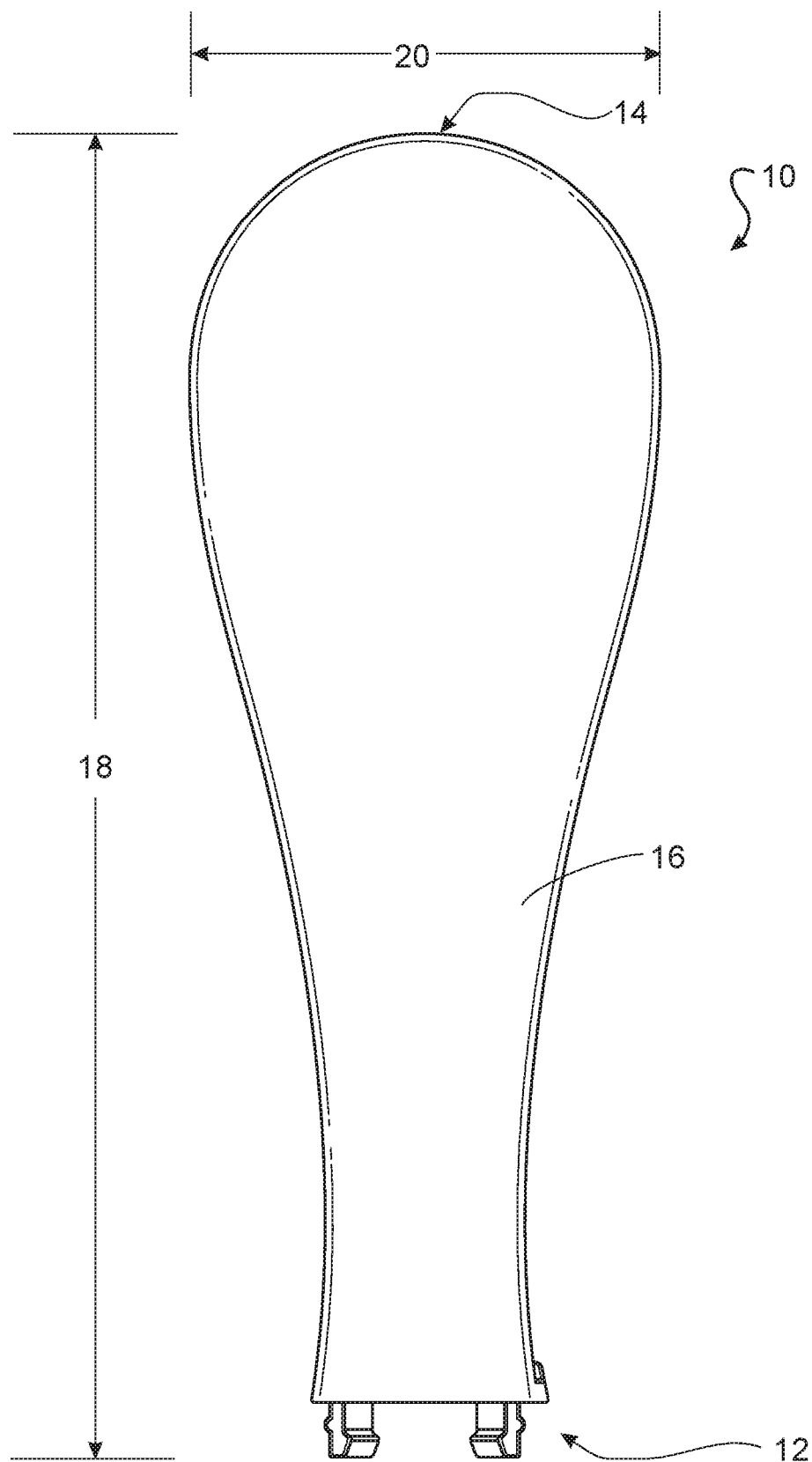
FIG. 1A is an elevation view of a massage head according to an embodiment of the present invention.

FIG. 1A is an elevation view of a head unit 10 in the form of a massage head according to an embodiment of the present invention. In FIG. 1A, the head unit 10 includes a proximal end 12 where the unit 10 is coupled to the handle unit (not shown) of the vibration unit, and a distal end 14 which is the point a furthest direct distance from any point at the proximal end. The unit 10 is three dimensional and may be characterized by a volume and an exterior surface 16 that defines the furthest reaches of that volume. The head unit may also be characterized by a length 18 defined as the furthest distance between the proximal end 12 and the distal end 14. The unit 10 may also be characterized by a width 20 defined as the longest distance between points on the exterior surface were that distance is perpendicular to the length 18 of the unit 10. The view of FIG. 1A suggests that the exterior surface is smooth, and in one embodiment of the invention the exterior surface is, in fact, smooth. However, in other embodiments of the invention the exterior is not smooth, but instead has bumps or ridges or otherwise-shaped extensions from the exterior surface. For instance, when the head unit functions as a massage head, then various surface extensions may be present on the surface in order to provide enhanced message effect.

Figure 1B:
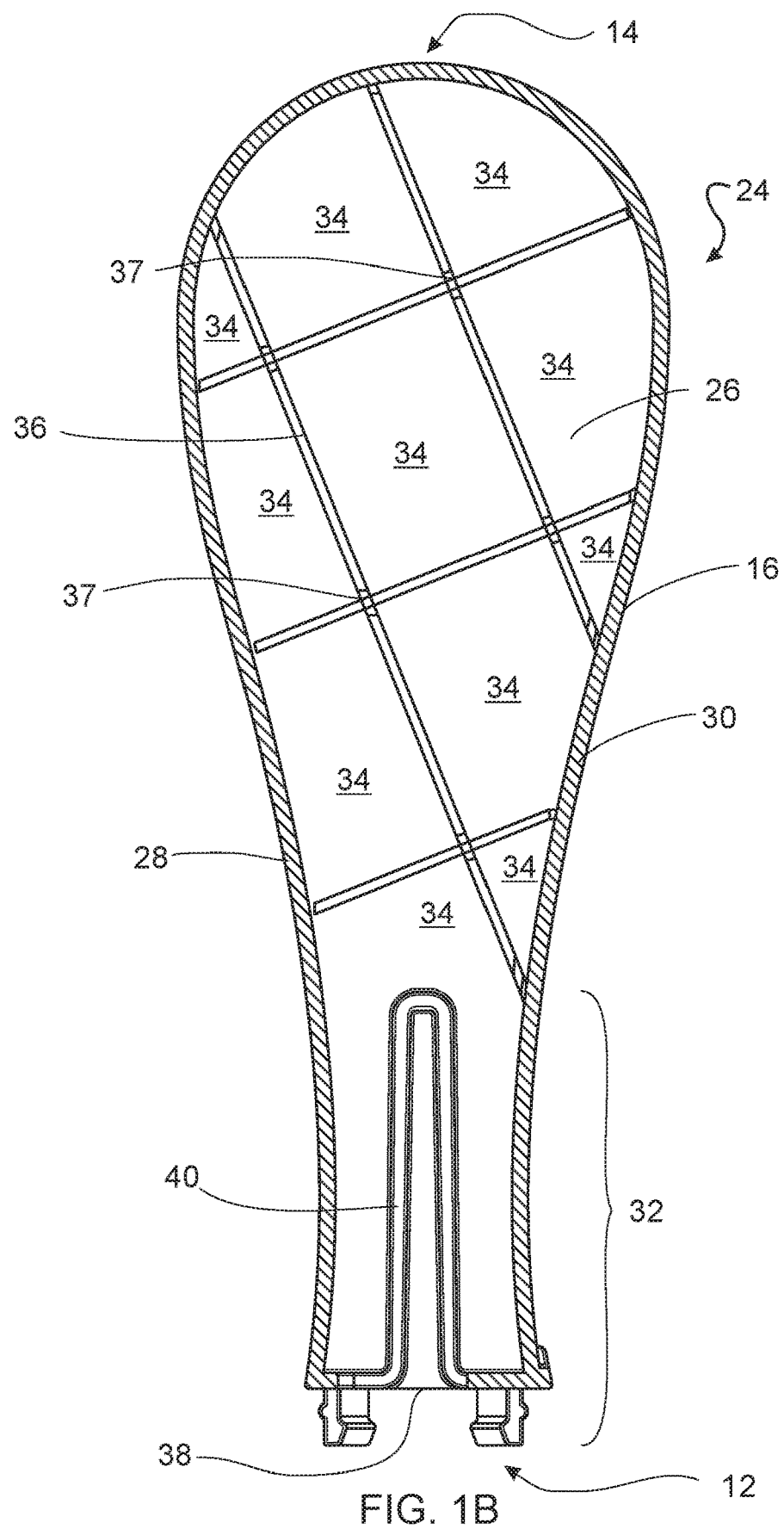
FIG. 1B is an elevation view of the right half of the massage head of FIG. 1A.

FIG. 1B is an elevation view of the right half of the massage head of FIG. 1A. FIG. 1B provides a view of one possible inside of the head unit 10 of FIG. 1A. In FIG. 1B, the head unit is shown cut in half to provide a right half 24. The image of the right half how the interior of the head unit, and reveals that the interior is largely hollow. The right half shows a portion of the proximal end 12 and the distal end 14 of the head unit 10. The interior of the head unit includes an interior surface 26 which follows, to a large degree, the contour of the exterior surface 16, where the interior surface 26 and the exterior surface 16 are separated by a distance 28 which is the thickness of the exterior wall 30 that forms a majority of the outside of the head unit. The exterior wall extends from the distal end of the head unit to a base 32 of the head unit, where the base 32 is adjacent to and extends from the proximal end 12 of the head unit. As will be discussed in greater detail elsewhere herein, the base 32 provides an interior configuration designed to couple with, or mate with, an adaptor (not shown) which will connect the head unit 10 to a vibration-inducing handle (not shown).

Still referring to FIG. 1B, the interior of head unit 10 contains a plurality of hollow chambers 34. In FIG. 1B, the interior of the head unit is broken into 11 interior chambers 34. In one embodiment of the present invention, the head unit comprises at least two hollow chambers 34, where a hollow chamber is a volume within the massage unit 10 that is not occupied by solid material, but instead is occupied by fluid, preferably gas, such as oxygen, nitrogen, or air. Hollow chambers 34 within the head unit are separated from one another by a scaffold 36 which connects to the exterior wall 30. In various embodiments, the interior of the head unit comprises 2 to about 20 chambers, such as 2 or 3 or 4 or 5 or 6 or 7 or 8 or 9 or 10 or 11 or 12 or 13 or 14 or 15 or 16 or 17 or 18 or 19 or 20 hollow chambers.

The presence of a plurality of hollow chambers in the unit 10 provides multiple benefits. One benefit is that it is observed that if the head unit comprises only a single hollow chamber, then when the device is in operation, it generates an undesirably loud noise. By breaking the interior of the head unit into multiple hollow spaces, that noise is greatly reduced. Another benefit is that the weight of the head unit is reduced when the interior comprises some portion of fluid, preferably gas, rather than solid material from which the exterior wall is made. A reduction in weight is beneficial because it reduces the strain on the coupling unit between the head unit and the handle, as described elsewhere herein.

Also shown in FIG. 1B are a plurality of interlocking notches 37 positioned in scaffold section, wherein the plurality of interlocking notches are configured to interlock and bind two halves of the head unit. In one embodiment, the scaffold sections comprising the interlocking notches extend beyond the exterior wall of one half of the head unit. This can be seen more clearly in FIG. 9.

Figure 2:
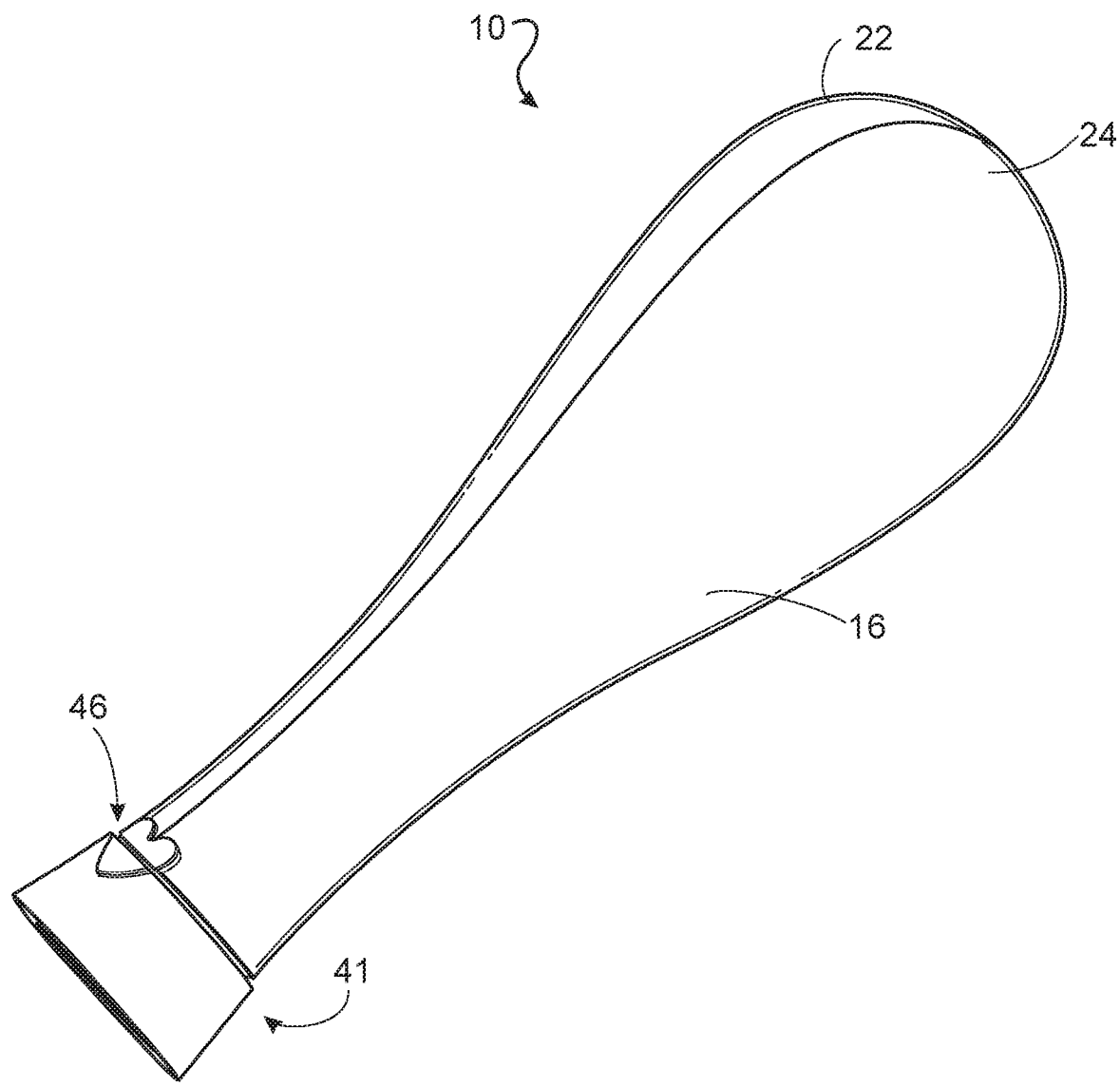
FIG. 2 is a perspective view of the massage head and a coupling mechanism whereby the massage head is coupled to the handle of a sonic or ultrasonic toothbrush.

The base 32 has an interior or opening 38 that is configured to accept a coupling mechanism 41 as seen in FIG. 2. In one embodiment, the base further comprises a coupler engagement member 40 configured to engage and secure a component of the coupling mechanism. As only one half of the head unit is shown, although it appears the coupler engagement member is flush with exterior wall 30, the coupler engagement member is set back in the hollow interior such that when the other half is attached, as seen in FIG. 2, there is a gap between each section of the coupler engagement member. This gap is necessary when the component of the coupling mechanism is engaged and secured in the coupler engagement member.

FIG. 2 also shows the left half 22 and the right half of the head unit 10. In order to connect the head unit 10 to a vibration-inducing handle, the coupling mechanism is provided. In one embodiment, the exterior surface of the head unit has a logo or insignia 46 protruding from the exterior surface. It is a particular advantage of the present invention, that the logo is split in two sections, wherein one section is provided on the exterior surface of the head unit and the other section is provided on an exterior surface of the coupling mechanism, such that when the coupling mechanism is engaged with the head unit the logo can be used as an alignment guide for a user during operation. In the exemplary instance shown, the logo is a heart, however it is understood that the logo or insignia may be any shape or design.

Figure 3A:
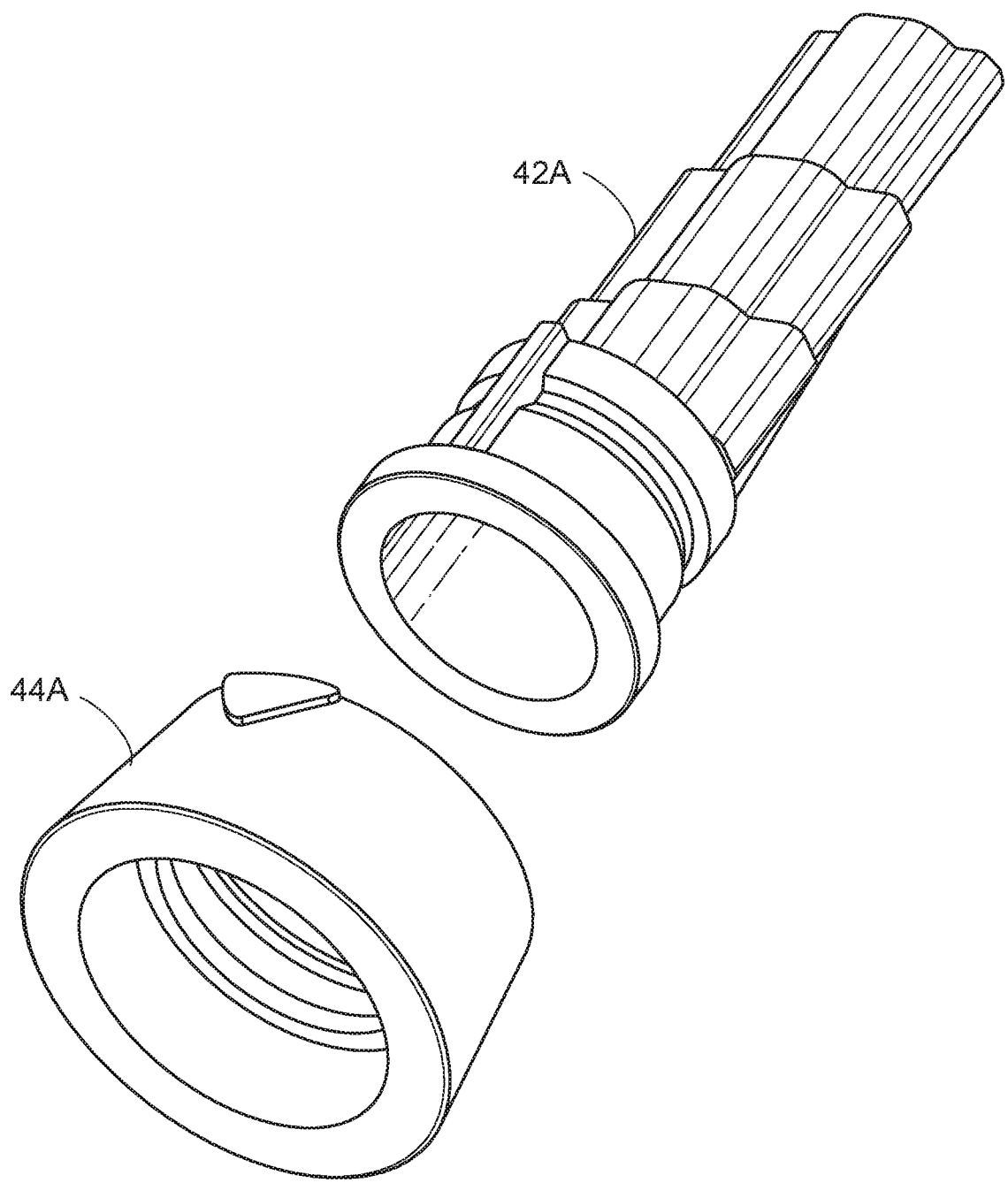
FIG. 3A is an exploded perspective view of the coupling mechanism according to an embodiment of the present invention.
Figure 3B:
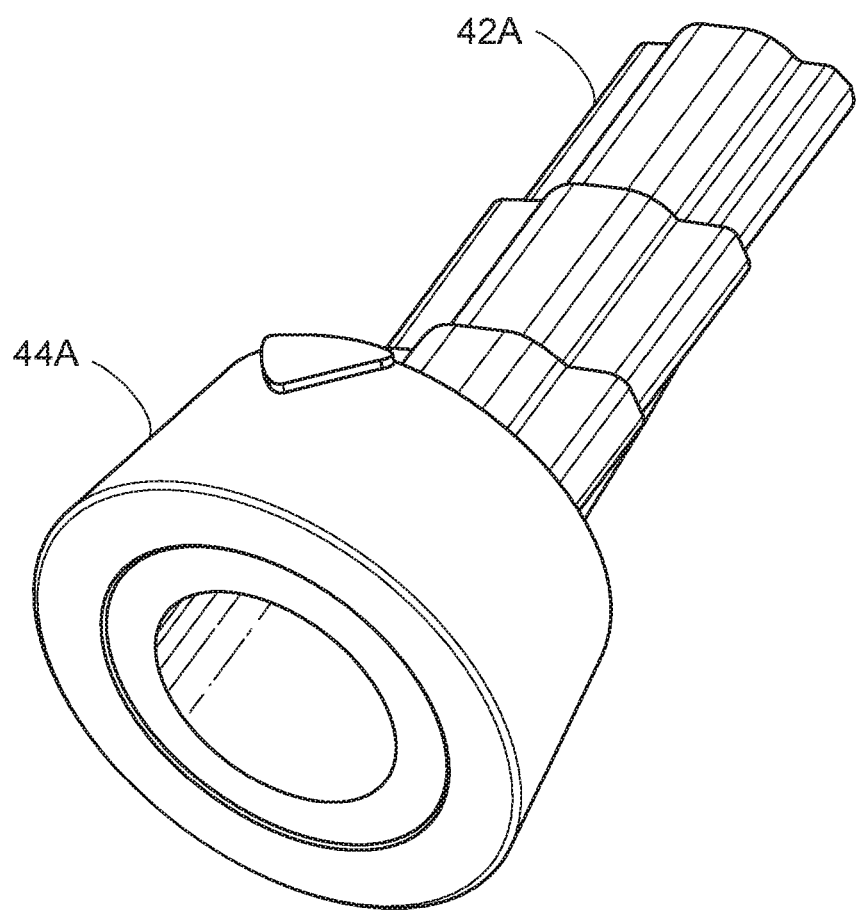
FIG. 3B is a perspective view of the coupling mechanism of FIG. 3A when the two components are seated against one another.

FIGS. 3A and 3B are various perspective views of the coupling mechanism according to an embodiment of the present invention. Referring now to FIGS. 3A and 3B, in one embodiment the coupling mechanism comprises a first coupler cam 42A and first coupler ring 44A. As shown in FIG. 3B, the first coupler cam and first coupler ring are distinct pieces, and in one embodiment of the device the coupling is provided by two distinct pieces 42A and 44A. However, in another embodiment the pieces 42A and 44A are joined together to form a unitary coupling piece (not shown). In one embodiment, the coupling mechanism is configured to connect the head unit to a number of vibration-inducing handles, and more particularly to a vibration-including handle provided via a sonic motion toothbrush, such as Sonicare® toothbrush. The details of the coupling mechanism and components will be discussed in greater detail below, however in short, the first coupler cam is configured to engage and connect to a vibration transfer shaft of the toothbrush, and the first coupler ring is configured to lock the connection in place.

Figure 4A:
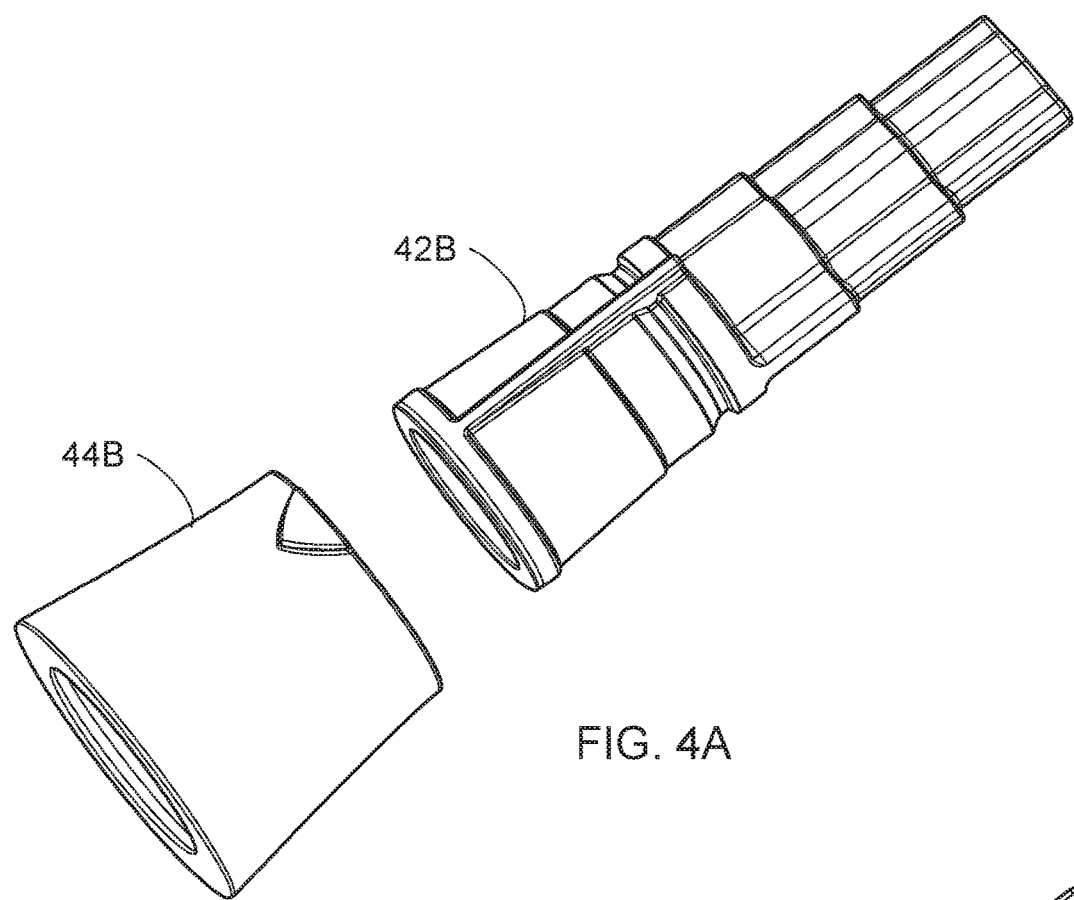
FIG. 4A is an exploded perspective view of an alternative coupling mechanism according to an embodiment of the present invention.
Figure 4B:
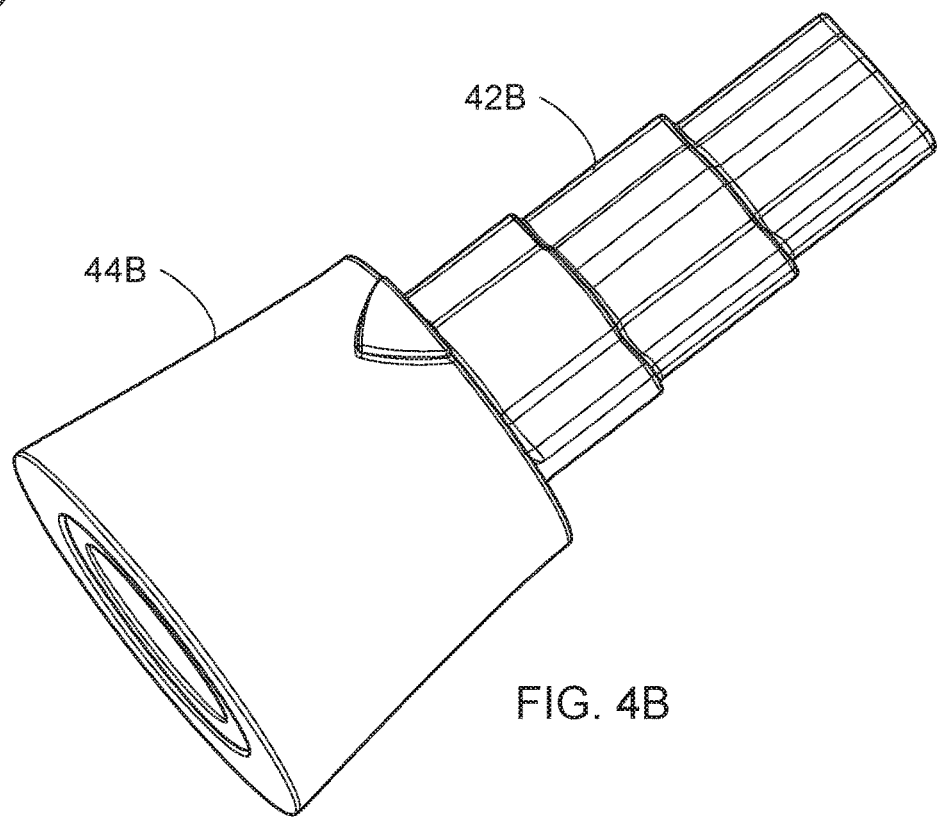
FIG. 4B is a perspective view of the alternative coupling mechanism of FIG. 4A when the two components are seated against one another.

FIGS. 4A and 4B are various perspective views of an alternative coupling mechanism according to an embodiment of the present invention. Referring now to FIGS. 4A and 4B, in one embodiment the coupling mechanism comprises a second coupler cam 42B and second coupler ring 44B. Similarly as the coupling mechanism described above, the second coupler cam and second coupler ting are distinct pieces, and in one embodiment of the device the coupling is provided by two distinct pieces 42B and 44B. However, in another embodiment the pieces 42B and 44B are joined together to form a unitary coupling piece (not shown). In one embodiment, the alternative coupling mechanism is configured to connect the head unit to a number of vibration-inducing handles, and more particularly to a vibration-including handle provided via an oscillating motion toothbrush, such as Oral-B® toothbrush. The alternative coupling mechanism functions similarly as the coupling mechanism of FIGS. 3A and 3B, however due to the difference in forces generated by the various vibration-inducing handles and shape of the components, the alternative coupling mechanism is necessary to provide the connection of the head unit to more toothbrushes commonly used.

Figure 5A:
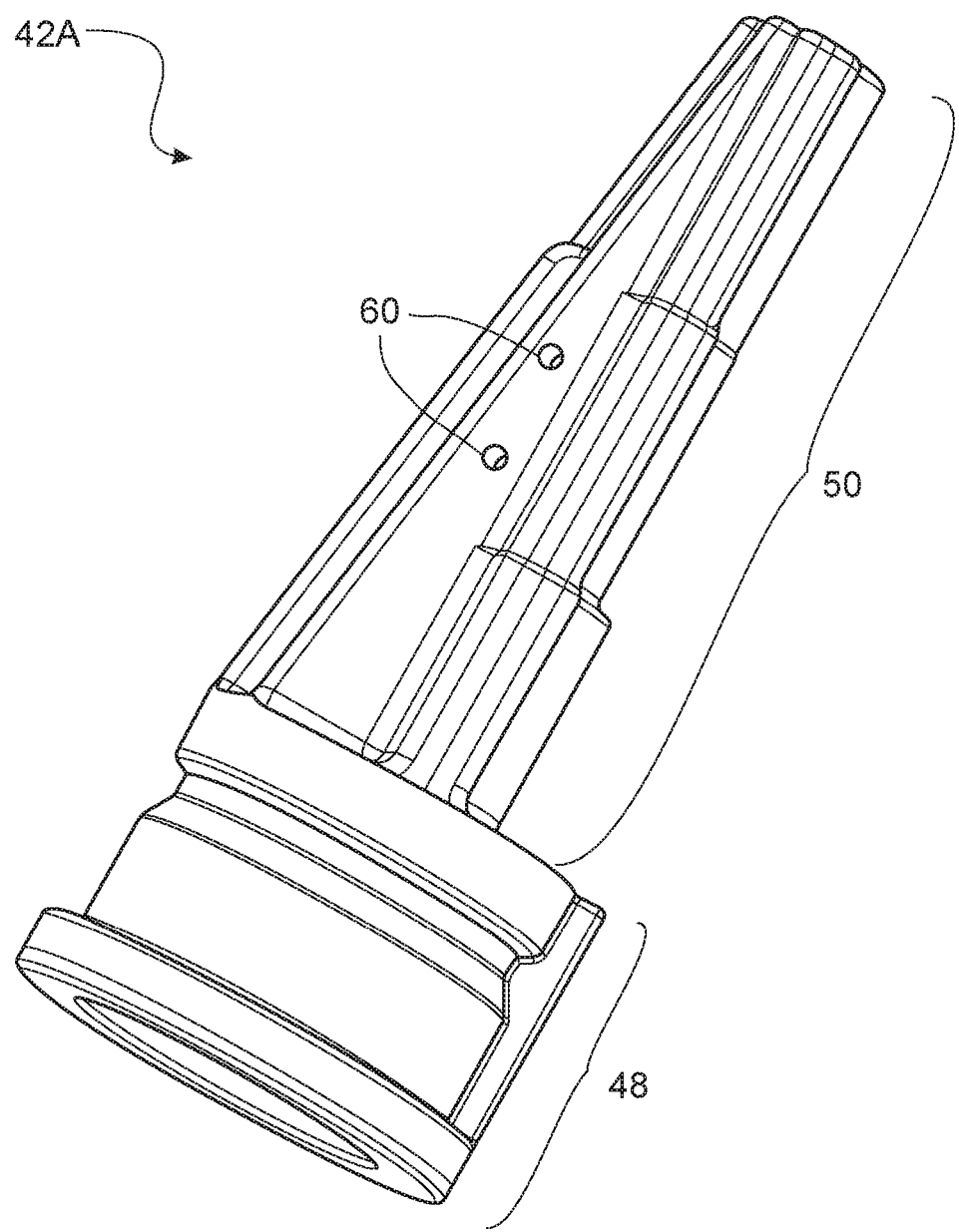
FIG. 5A, FIG. 5B, and FIG. 5C provide various perspective views of the first coupler cam according to an embodiment of the present invention.
Figure 5B:
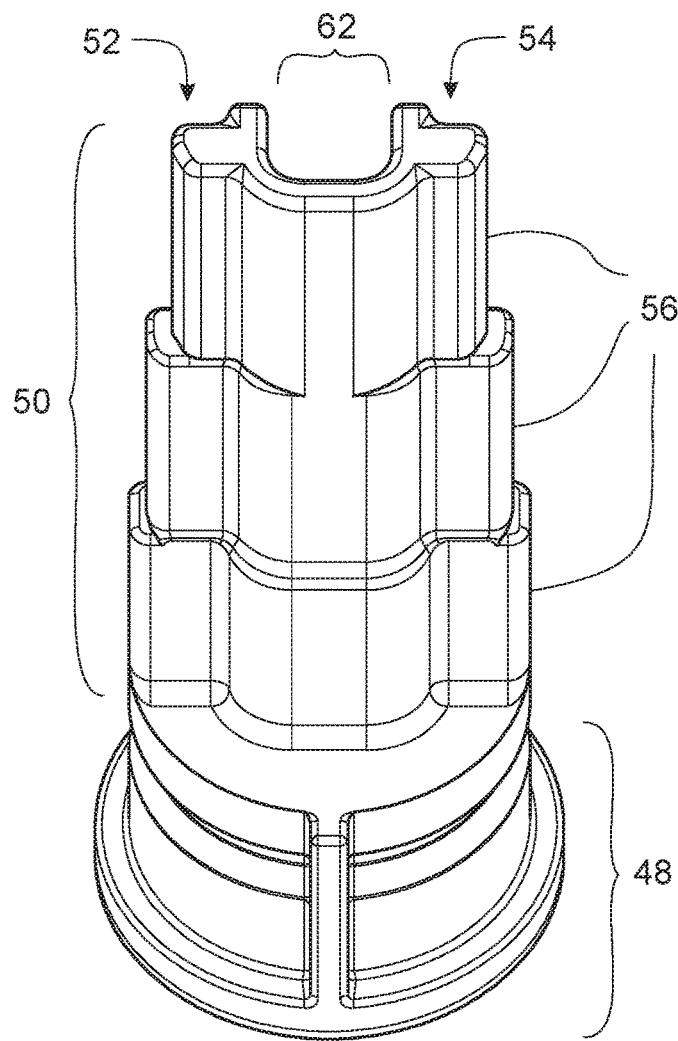
Figure 5C:
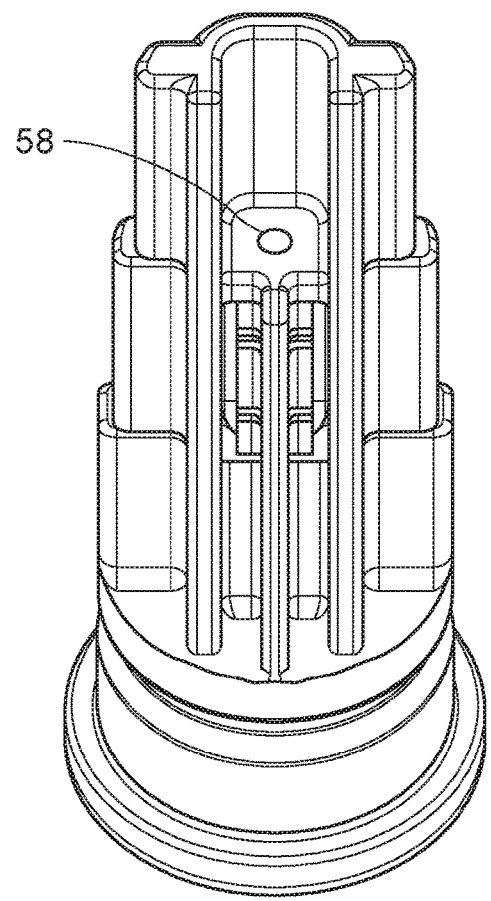

FIG. 5A, FIG. 5B, and FIG. 5C provide various perspective views of the first coupler cam according to an embodiment of the present invention. Although, the first coupler cam is illustrated, the following disclosure herein also applies to the second coupler cam apart from a few differences which will be addressed below. The coupler cam comprises a base portion 48 and top portion 50. As seen in FIG. 3B and previously discussed, the base portion is configured to engage the coupler ring. The length of the base unit may vary depending on components of the toothbrush, and more particularly to the respective vibration-inducing handle the coupler cam is configured to attach to. For instance, the length of the mounting 80 (FIG. 10A, FIG. 11C, or FIG. 12C) will impact the length of the base portion in order to provide the necessary space between the interior of the surface of the base portion and the mounting, as it is a particular advantage of the present invention to engage only the vibration transfer shaft and not the mounting. This will be discussed in further detail below.

The top portion includes a left finger 52 and a right finger 54 each having a plurality of cascading contact surfaces 56. Each finger and respective plurality of cascading contact surfaces extends from the coupler base 48. In one embodiment, each finger is configured to be secured in a section of the coupler engagement member 40 (FIG. 1B) during operation, that is, the left finger in one half of the head unit and the right finger in the other half of the head unit. The coupler cam further comprises a material reduction portion 62 and hole 58. In one embodiment, the material reduction and other design aspects of the coupler cam are indented for weight reduction purposes; however there are criticalities in specific design aspects, such as the plurality of cascading contact contact surfaces. During operation, when vibration is transferred from a vibration-inducing handle to the vibration transfer shaft, which is situated in a cavity 94 (FIG. 11C or FIG. 12C) of the coupler cam, the plurality of cascading contact surfaces transfer the vibration to the head unit via the coupler engagement member and base of the head unit. The plurality of cascading contact surfaces provides a sufficient number of contact surfaces to transfer vibrations sufficiently while minimizing noise. Specifically, less mass as the top portion extends upwards improves the transfer of vibrations to the head unit.

In one embodiment, the hole allows pressure to escape the cavity during operation. In one embodiment, support pin holes are provided on the coupler cam, wherein the support pin holes are configured to accept support pins (not shown), preferably stainless steel pins, which provide support to the material of the coupler cam. Only the first coupler cam includes the support pin holes, as the forces generated by a sonic motion toothbrush are substantially greater than the forces generated by an oscillating motion toothbrush. Thus, the support pins add strength and support to prevent material fatigue and breakage during operation. It is also a particular advantage of the present invention, that the support pins act as a spring providing a greater force on the vibration transfer shaft in the cavity, as well as increasing the friction engagement between interior surface 92 (FIG. 11C or FIG. 12C) of the coupler cam and the vibration transfer shaft. The additional force and friction engagement via the support pins is approximately 5 Newtons.

Figure 6:
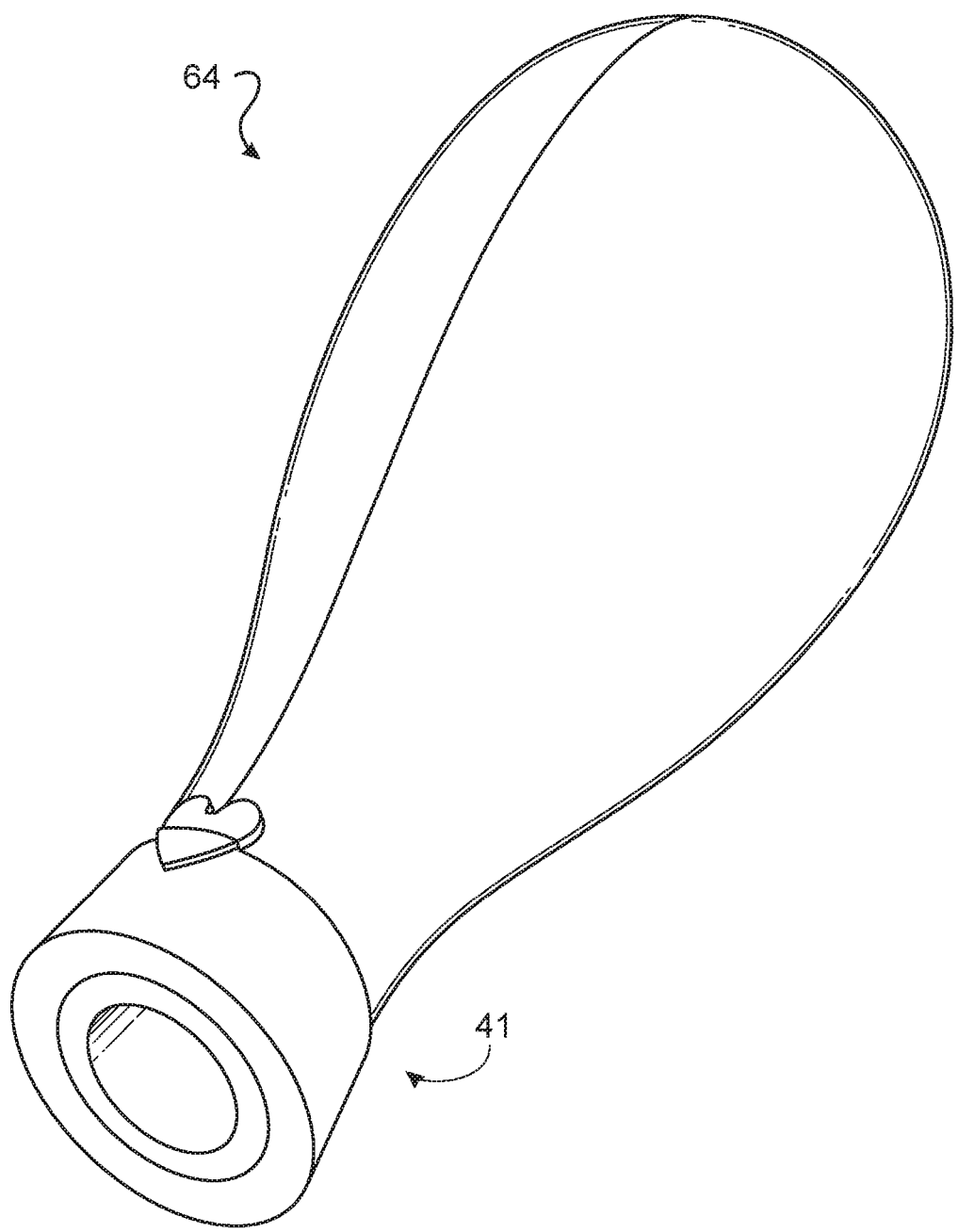
FIG. 6 is a perspective view of an alternative massage head and a coupling mechanism according to an embodiment of the present invention.
Figure 7:
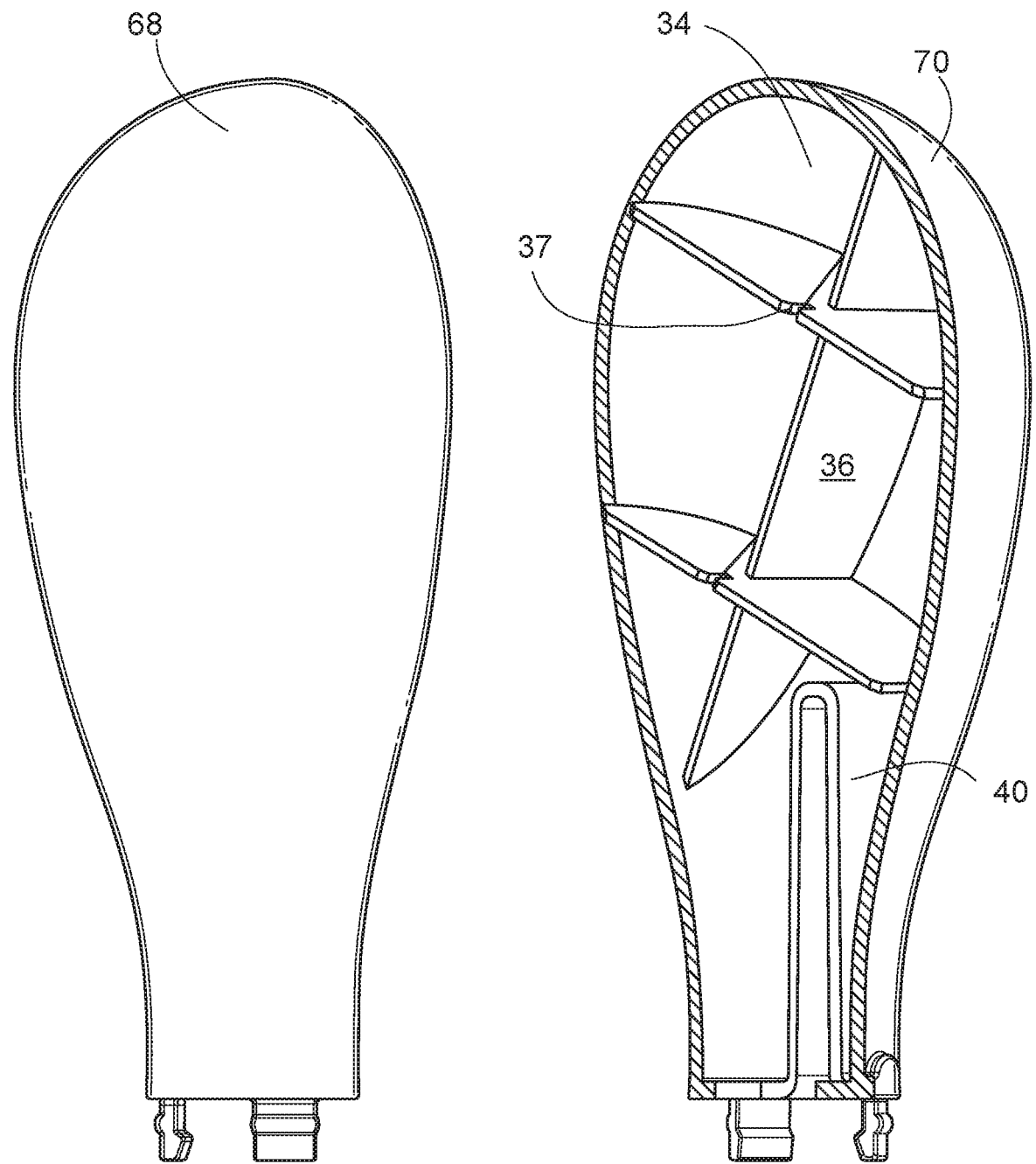
FIG. 7 is a perspective view showing the two halves of the alternative massage head of FIG. 6 with the coupling mechanism removed.
Figure 8:
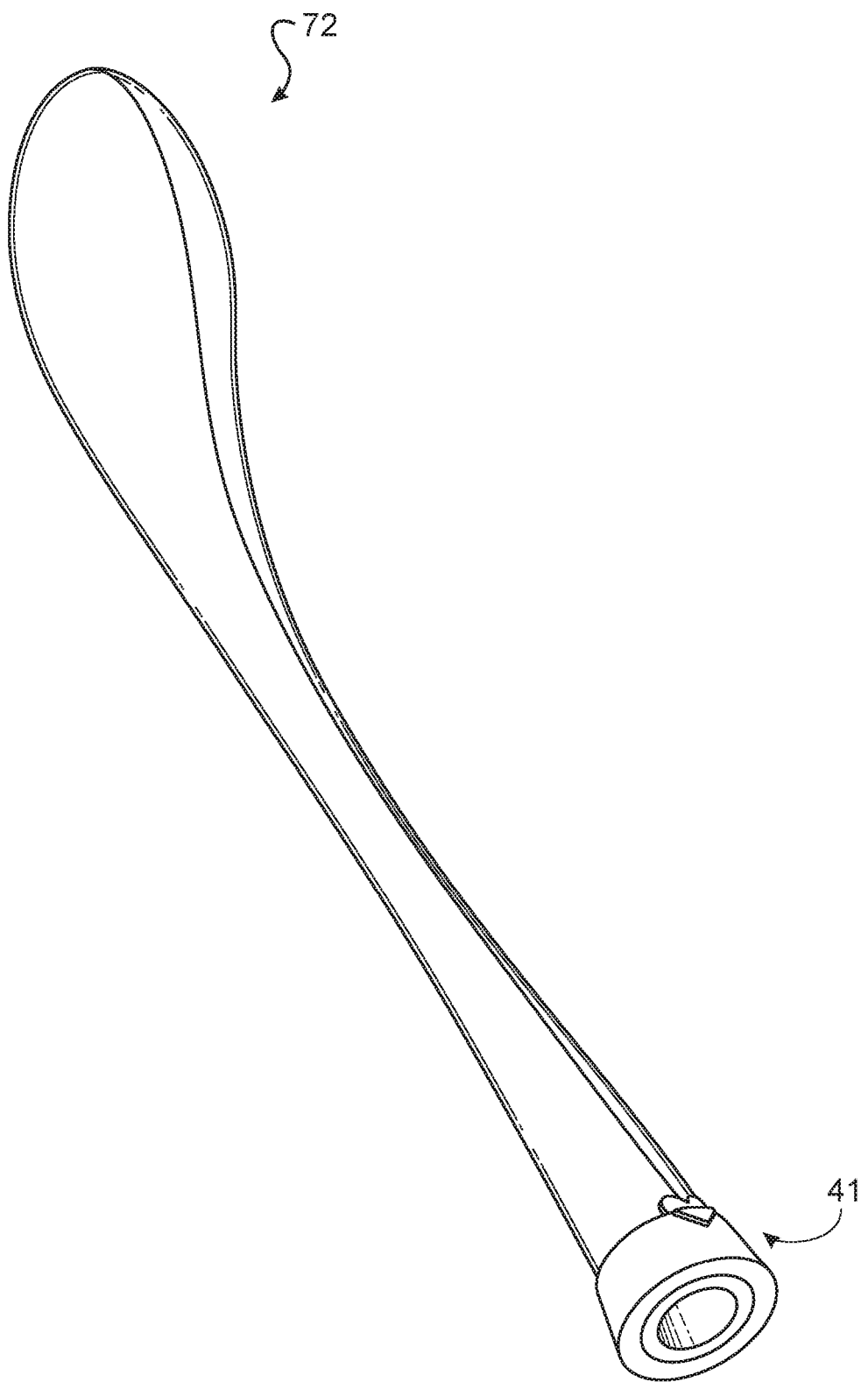
FIG. 8 is a perspective view of a non-symmetrical massage head and a coupling mechanism according to an embodiment of the present invention.
Figure 9:
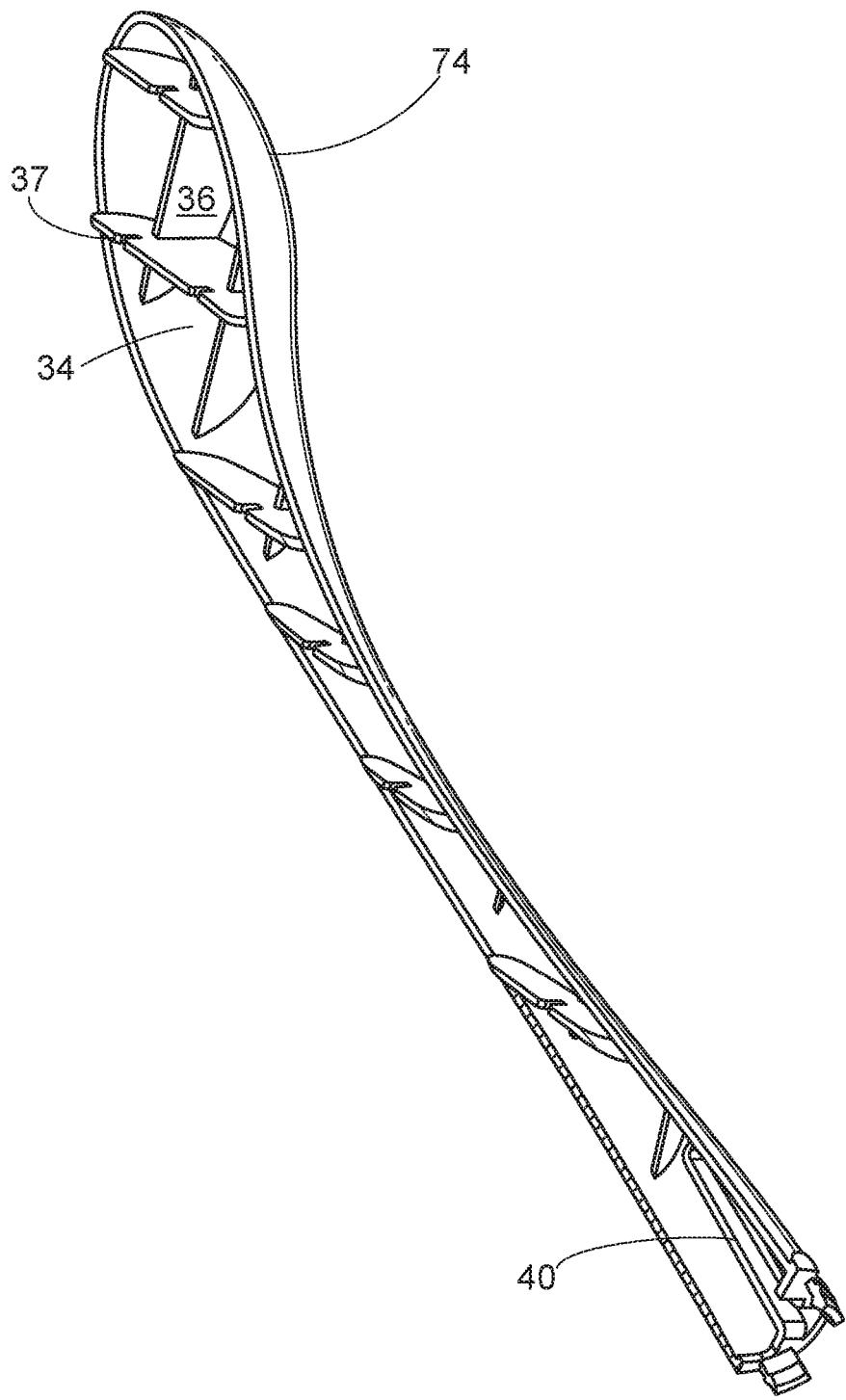
FIG. 9 is a perspective view of the left half of the non-symmetrical massage head of FIG. 8.

The first and second coupler cam and coupler ring may be used to secure a variety of shapes of a head unit to a handle that induces a vibration in the vibrating device of the present disclosure. FIG. 2 shows a symmetrical massage unit 10 in the shape of an elongate bulb that is symmetrical around a longitudinal axis that extends from the proximal end to the distal end of the massage unit 10. FIG. 6 shows an alternative shaped massage head 64 and coupling mechanism 41. The alternative shaped massage head has a symmetrical blub shape, less elongated than the massage unit 10. FIG. 7 shows two halves, namely right half 68 and left half 70, of a symmetrical massage unit 64. This massage unit 64 has 6 hollow chambers 34. FIG. 8 shows a non-symmetrical massage unit 72 and coupling mechanism 41. FIG. 9 shows the left half of massage unit 72 exposing the scaffold and interlocking notches previously discussed. This massage unit 72 has 18 hollow chambers 34.

Figure 10A:
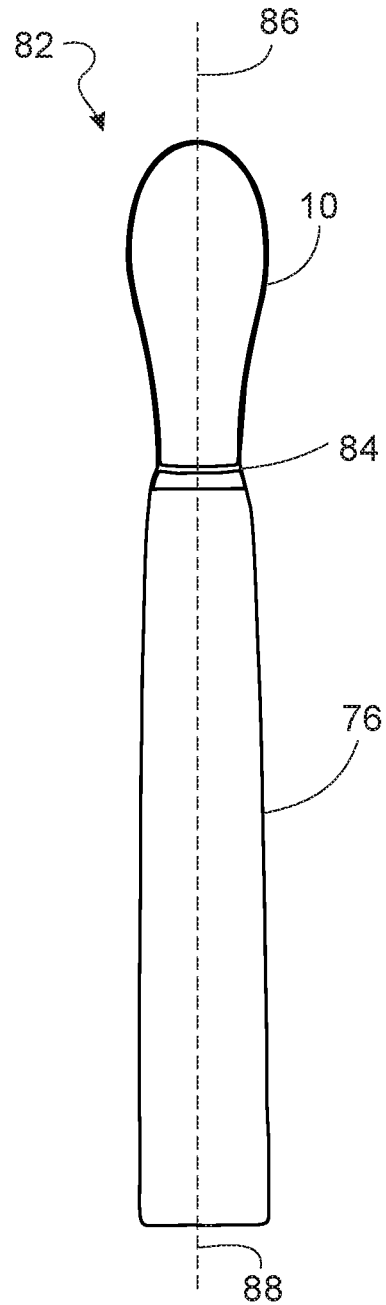
FIG. 10A, FIG. 10B, and FIG. 10C provide various perspective views of a vibrating device according to an embodiment of the present invention.
Figure 10B:
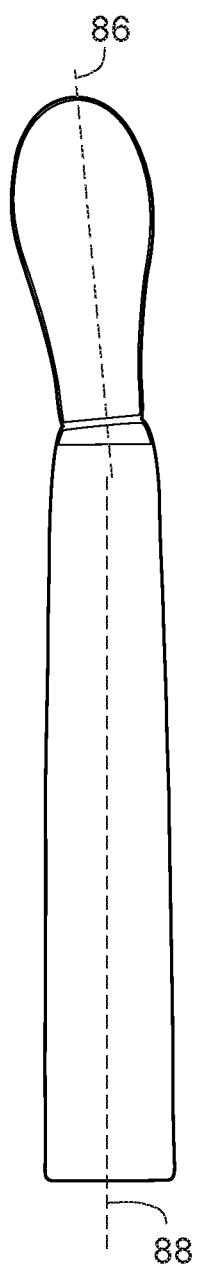
Figure 10C:
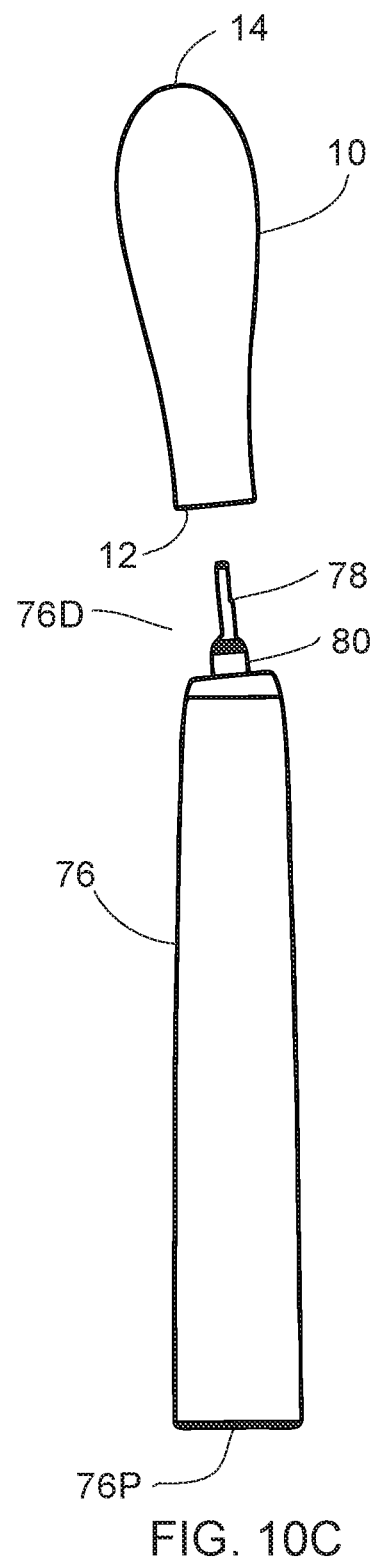

FIG. 10A and FIG. 10B provide various perspective views of a vibrating device 82 according to an embodiment of the present invention. The views show a head unit 10 engaged with a power handle unit 76 to provide a vibrating device 82 of the present invention. In FIGS. 10A and 10C, the head unit 10 has a longitudinal axis 86 and the power handle 76 has a longitudinal axis 88. In FIG. 10A it appears that the longitudinal axes 86 and 88 occupy the same line, i.e., they are co-linear. However, in FIG. 10B it can be seen that the head unit 10 is actually tilted relative to the power handle 68, so that longitudinal axis 86 is not co-linear with longitudinal axis 88 from the perspective of FIG. 10B. That said, in one embodiment of the device 82, the longitudinal axis 86 of the head unit 10 and the longitudinal axis 88 of the power handle 68 are co-linear. The head unit 10 and the power handle 76 meet at junction 84, where the two components are seen to touch one another. In other embodiments, one or both of the head units and the power handle may be shaped such that one cannot readily identify a longitudinal axis of one or the other component.

FIG. 10C is perspective view corresponding to FIG. 10B, where in the head unit 10 is disengaged from the power handle 76. With the head unit 10 pulled away from the power handle, it can be seen that the power handle has a proximal end 76P and a distal end 76D, and the head unit 10 also has a proximal end 12 and a distal end 14. The distal end 76D of the power handle 68 has a vibration transfer shaft 78 which sits atop of a mounting 80. The head unit 10 has an opening 38 (not shown) at its proximal end 12, and that opening provides entry into a cavity which lies at the proximal end of the head unit 10. When the head unit 10 is engaged with the power handle, the shaft 78 passes through the opening and into the cavity of the head unit.

Figure 11A:
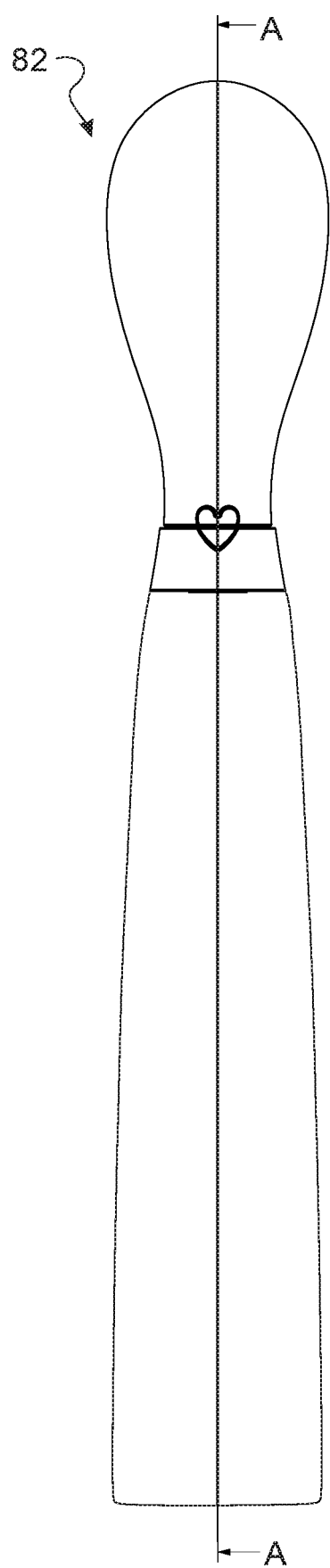
FIG. 11A is a front perspective view of a vibrating device according to an embodiment of the present invention.
Figure 11B:
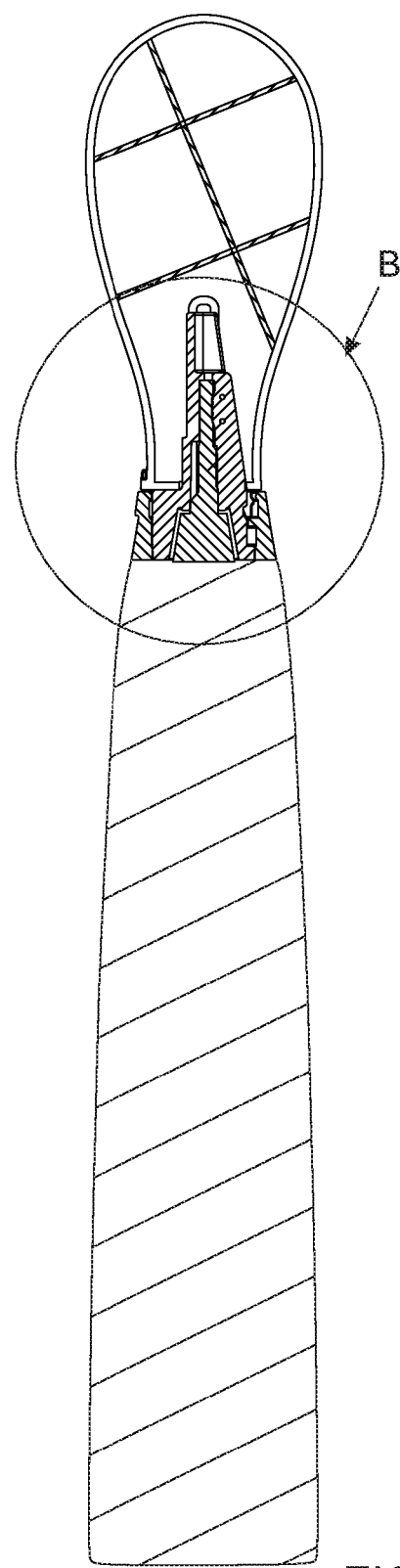
FIG. 11B is a section view taken along section A-A of FIG. 11A, although the interior parts of the handle unit are omitted.
Figure 11C:
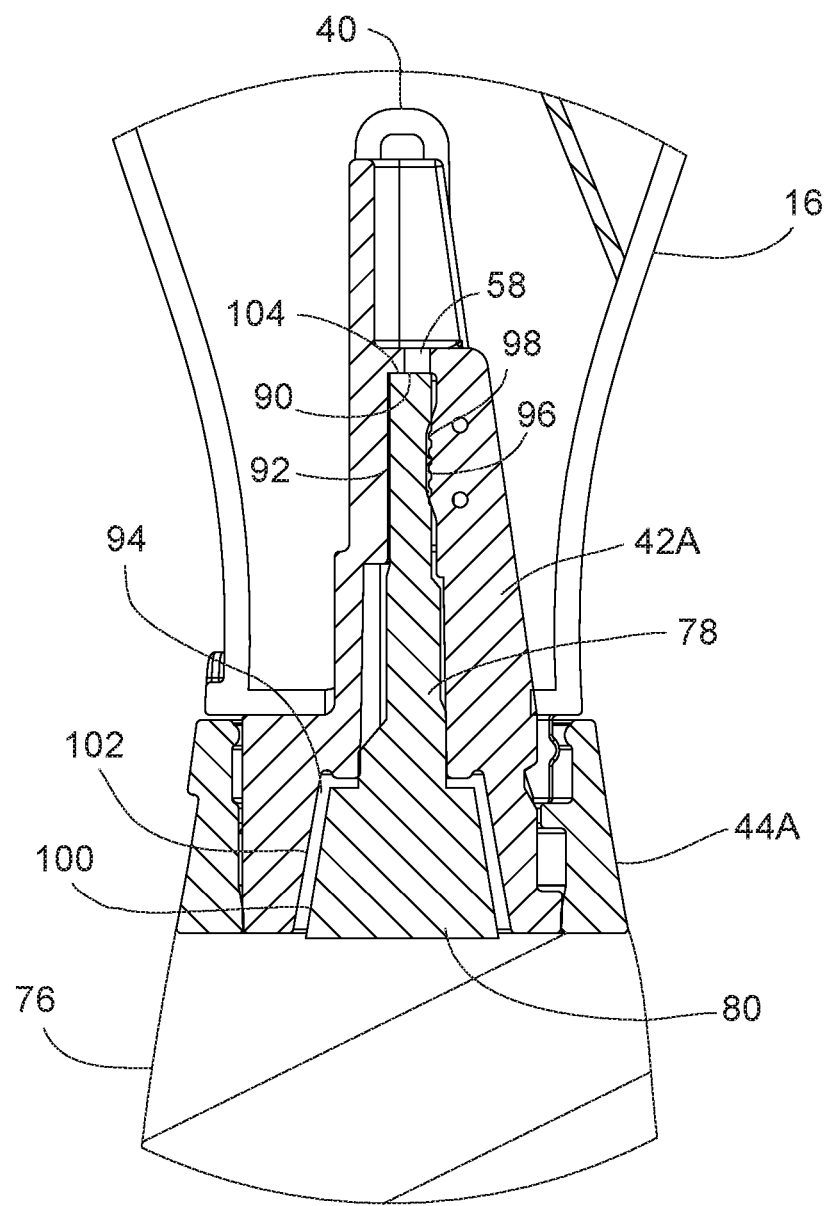
FIG. 11C is a detailed view of detail B of FIG. 11B.

FIG. 11A is a front perspective view of a vibrating device 82 according to an embodiment of the present invention. FIG. 11B is a section view taken along section A-A of FIG. 11A, although the interior parts, for example, the pieces that generate the vibratory motion of the handle unit, are omitted for convenience. FIG. 11C is a detailed view of detail B of FIG. 11B. Referring now to FIG. 11C, the distal end of the power handle 76 is seen to terminate in a mounting 80 for the vibration transfer shaft 78. The coupling mechanism including the first coupler cam 42A and first coupler ring 44A are illustrated, but it should be understood that the second coupler cam and ring would function similarly as described apart from the aforementioned differences. The coupler cam is seen to extend into the base and of the head unit. The mounting 80 has exterior side surface 100 which is complementary in size and shape to a portion of an interior side surface 102 of the coupler cam, however these two complementary side surfaces 100 and 102 do not directly abut one another when the head unit is engaged with the power handle forming a cavity 94. The vibration transfer shaft extends from the mounting to create a friction force with an interior surface 92 of the coupler cam. As previously discussed, coupler ring helps to lock in this connection to prevent the head unit from separating from the power handle during operation. In one embodiment, the vibration transfer shaft includes ridges 98 at a distance below the tip 90 of the vibration transfer shaft. In this embodiment, the friction engagement between the vibration transfer shaft and the interior surface 92 is primarily at the ridges. In one embodiment, interior surface 92 includes an interior protrusion surface 96 configured to increase the friction engagement at the ridges of the vibration transfer shaft. Preferably, the tip 90 is not friction engaged, although there is incidental contact during operation. For instance, in one embodiment, a silicone plug (not shown) is situated between the tip of the vibration transfer shaft and a top interior surface 104 of the coupling cam. The silicone plug provides cushioning to the tip 90 of the vibration transfer shaft. When the vibration transfer shaft is inserted into the coupling cam air pressure may build up, so a hole 58 is provided to release the pressure. However, it is critical that liquids are prevented from entering the internal volume of the head unit, so in some embodiments, a flapper valve (not shown) is provided to release built up air pressure but to prevent liquids from entering the head unit during operation. In one embodiment, the flapper valve may be integrated in hole 58 or in the silicone plug which may also include a vent hole. Also visible in detail B of FIG. 11B, is a section of the coupler engagement member 40 configured to secure the fingers of the coupler cam as previously discussed. The direct contact between the finger of the coupler cam and the engagement member of the head unit results in some vibrational energy being transferred from the shaft 78, through the coupler cam, and through the engagement member until that energy reaches the exterior surface 16 of the head unit. A person, who is touching the exterior surface 16 when the power handle 76 is actively generating a vibration, will feel the vibration.

Figure 12A:
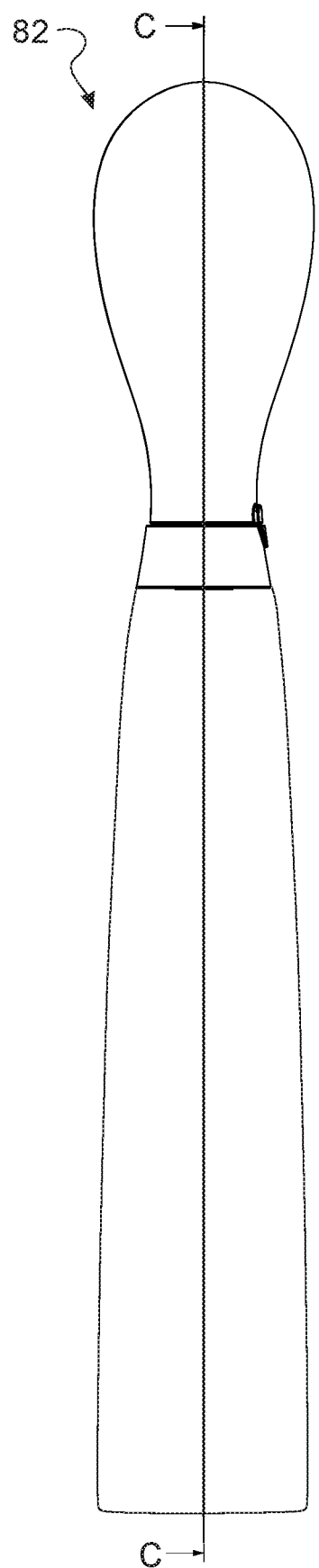
FIG. 12A is a side perspective view of the vibrating device according to an embodiment of the present invention.
Figure 12B:
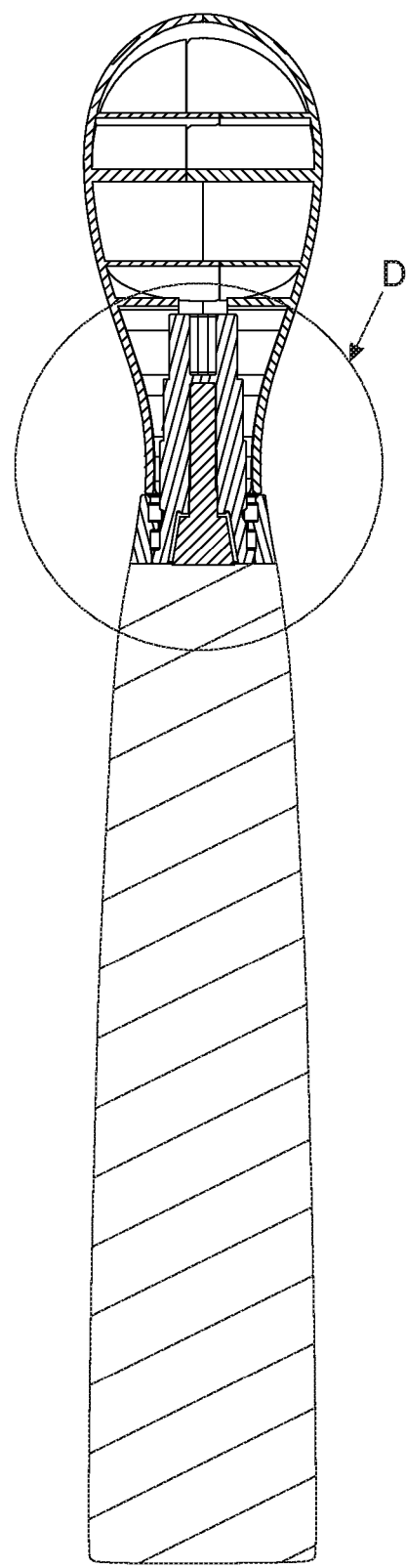
FIG. 12B is a section view taken along section C-C of FIG. 12A, although the interior parts of the handle unit are omitted.
Figure 12C:
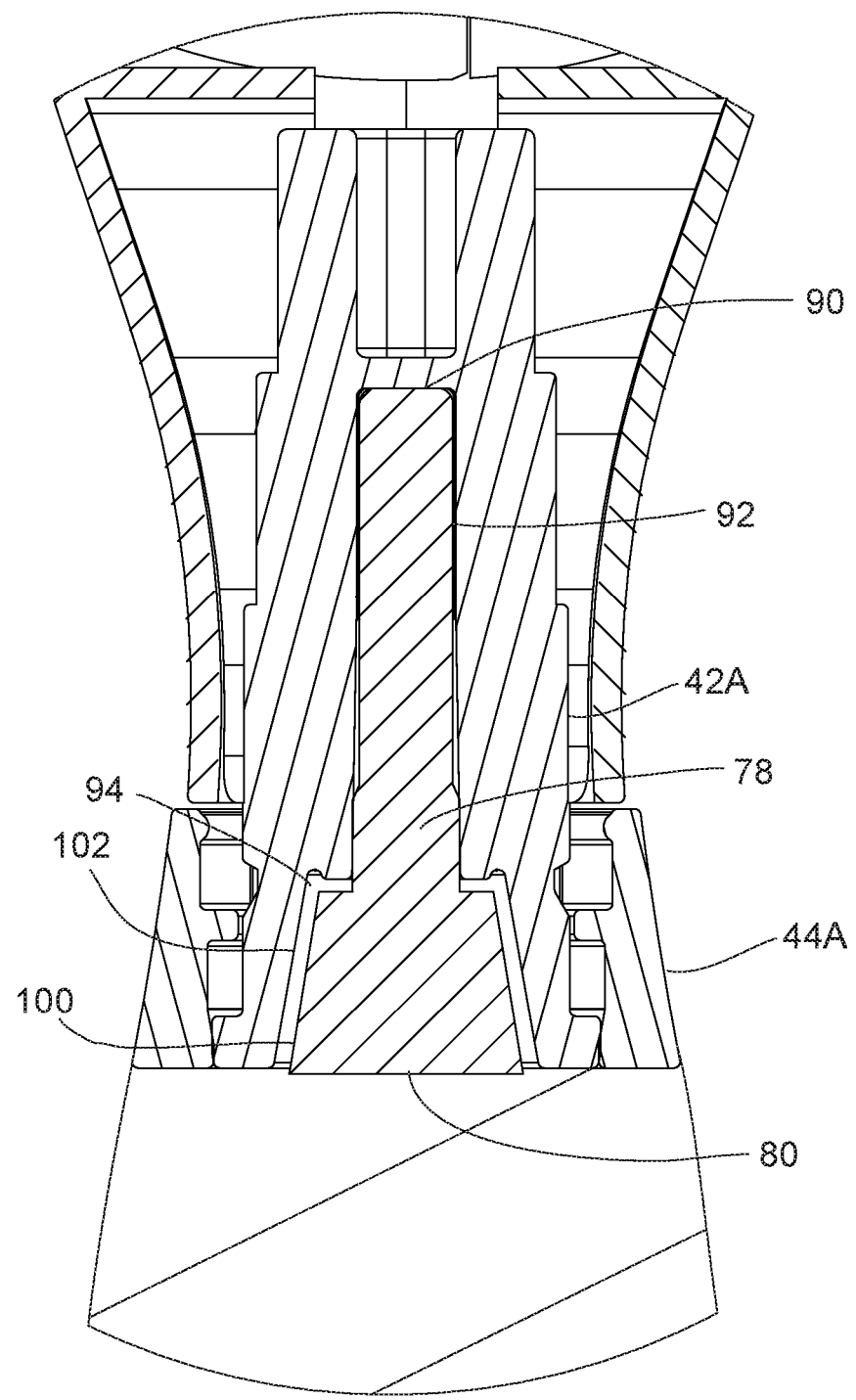
FIG. 12C is a detailed view of detail D of FIG. 12B.

FIG. 12A is a front perspective view of a vibrating device 82 according to an embodiment of the present invention. FIG. 12B is a section view taken along section C-C of FIG. 12A, although the interior parts, for example, the pieces that generate the vibratory motion of the handle unit, are omitted for convenience. FIG. 12C is a detailed view of detail D of FIG. 12B. Referring now to FIG. 12C, this detailed view is similar to the detailed view of FIG. 11C, however it is a detail of a section view of FIG. 12B which was rotated 90 degrees from section view FIG. 11B. In this view, it can be seen clearly that the interior surface 92 of coupler cam 42A is in a friction engagement with the vibration transfer shaft 78 not the mounting 80 as a cavity is formed 94 between the exterior side surface 100 and interior side surface 102.

Thus, the present invention provides a head unit, such as a massage head, that couples to a handle of an electric toothbrush, where vibrations generated by an element in the handle which are transferred to the head unit, where the head unit comprises an exterior wall that encases a plurality of hollow chambers, each hollow chamber containing gas. In one embodiment, the massage head may have 2 hollow chambers. In one embodiment, the massage head may have from 6 to 20 hollow chambers. Each chamber may contain a gas, such as air or other gas that is or includes oxygen and/or nitrogen. The massage head may be made from a sturdy material, such as polyoxymethylene. However, it is understood that the material used may change without departing form the scope and sprit of the invention. Preferably, the material selected has a density value less than 1.0

D (kg/m³), a coefficient of Friction (μ) value with stainless steel of 0.3, a sound deadening (measured by tensile strength ASTM D638 and ISO 527) of greater than 32 MPa, and a sound deadening (measured by absorbed energy) of greater than 0.49 J.

The present device may be used for the massaging and stimulation of tissue. A person may direct the massage head against tissue where a vibratory effect is desirably felt.

All of the U.S. patents, U.S. patent application publications, U.S. patent applications, foreign patents, foreign patent applications and non-patent publications referred to in this specification are incorporated herein by reference, in their entirety. Such documents may be incorporated by reference for the purpose of describing and disclosing, for example, materials and methodologies described in the publications, which might be used in connection with the presently described invention. The publications discussed above and throughout the text are provided solely for their disclosure prior to the filing date of the present application. Nothing herein is to be construed as an admission that the inventors are not entitled to antedate any referenced publication by virtue of prior invention.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCE SIGNS LIST

TABLE 1

| Reference Numeral | Part Name |
| --- | --- |
| 10 | Head unit |
| 12 | Proximal end of head unit 10 |
| 14 | Distal end of head unit 10 |
| 16 | Exterior surface of the head unit 10 |
| 18 | Length of head unit 10 |
| 20 | Width of head unit 10 |
| 22 | Left half of head unit 10 |
| 24 | Right half of head unit 10 |
| 26 | Interior surface of head unit 10 |
| 28 | Thickness of exterior wall of head unit 10 |
| 30 | Exterior wall of head unit 10 |
| 32 | Base of head unit 10 |
| 34 | Hollow chambers |
| 36 | Scaffold |
| 37 | Interlocking notches |
| 38 | Opening |
| 40 | Coupler engagement member |
| 41 | Coupling mechanism |
| 42A | First Coupler cam |
| 42B | Second Coupler cam |
| 44A | First Coupler ring |
| 44B | Second Coupler ring |
| 46 | Alignment element |
| 48 | Base portion of coupler cam 42A |
| 50 | Top portion of coupler cam 42A |
| 52 | Left finger |
| 54 | Right finger |
| 56 | A plurality of cascading contact surfaces |
| 58 | Hole |
| 60 | Support Pin holes |
| 62 | Material reduction |
| 64 | Alternative head unit |
| 68 | Right half of head unit 66 |
| 70 | Left half of head unit 66 |
| 72 | Non-symmetrical head unit |
| 74 | Left half of head unit 72 |
| 76 | Handle unit |
| 76P | Proximal end of handle unit 76 |
| 76D | Distal end of handle unit 76 |
| 78 | Vibration transfer shaft |
| 80 | Mounting |
| 82 | Vibrating device |
| 84 | Junction between 10 and 76 |
| 86 | Longitudinal axis of head unit 10 |
| 88 | Longitudinal axis of handle unit 68 |
| 90 | Tip of vibration transfer shaft |
| 92 | Interior surface of coupler cam 42A |
| 94 | Cavity of coupler cam 42A |
| 96 | Interior protrusion surface of coupler cam 42A |
| 98 | Ridges on vibration transfer shaft 78 |
| 100 | Exterior surface of mounting 80 |
| 102 | Interior side surface of coupler cam 42A |
| 104 | Top interior surface of coupler cam 42A |

What is claimed is:

1. A head unit configured to couple to a handle of an electric toothbrush; wherein the handle generates vibrational energy transferred to the head unit, the head unit comprising:
    a proximal end and a distal end;
    a base adjacent to the proximal end;
    an exterior wall extending from the proximal end to the distal end, wherein the exterior wall encases a plurality of hollow chambers, wherein each of the plurality of hollow chambers are separated by a scaffold, wherein the scaffold connects to the exterior wall;
    a bulb having an exterior surface configured to transfer the vibrational energy to an object; and wherein the head unit includes a left half and a right half and the scaffold includes interlocking notches configured to attach the left half and the right half together.

2. The head unit of claim 1, wherein the plurality of hollow chambers are occupied by a gas.

3. The head unit of claim 2, wherein the plurality of hollow chambers is selected between 6 and 20 hollow chambers, wherein the plurality of hollow chambers reduce weight of the head unit while reducing noise generated during operation when the head unit is coupled to the handle of the electric toothbrush.

4. The head unit of claim 1, wherein the base includes an opening and a coupling engagement member.

5. The head unit of claim 4, wherein the opening is configured to accept a coupling mechanism, wherein the coupling mechanism is configured to connect the head unit to the handle of the electric toothbrush, wherein the handle includes a vibrating shaft extending from a mounting.

6. The head unit of claim 5, wherein the coupling mechanism includes a coupler cam and a coupler ring, wherein the coupler cam is configured to engage the coupling engagement member and the coupler ring is configured to lock the connection between the head unit and the handle of the electric toothbrush.

7. The head unit of claim 6, wherein the coupler cam comprises a base portion and a top portion, wherein the base portion is configured to engage the coupler ring and the top portion includes a left finger and a right finger each having a plurality of cascading contact surfaces extending from the base portion.

8. The head unit of claim 7, wherein the left finger and the right finger is configured to be secured in a section of the coupling engagement member such that during operation the vibrational energy is transferred from the handle of the electric toothbrush to the vibrating shaft to the plurality of cascading contact surfaces, which transfers the vibrational energy to the coupling engagement member the blob of the head unit.

9. The head unit of claim 8, wherein the plurality of cascading contact surfaces extend upwards from the base portion which improves vibrational energy transfer and minimizes noise.

10. The head unit of claim 8, wherein vibrating shaft includes a tip and a number of ridges positioned at a distance below the tip, and the vibrating shaft creates a friction force with an interior surface of the coupler cam, wherein the friction force is at the number of ridges.

11. A head unit configured to couple to a handle of an electric toothbrush, wherein the handle generates vibrational energy transferred to the head unit, the head unit comprising:
    a proximal end and a distal end;
    a base adjacent to the proximal end;
    an exterior wall extending from the proximal end to the distal end, wherein the exterior wall encases a plurality of hollow chambers, wherein each of the plurality of hollow chambers are separated by a scaffold, wherein the scaffold connects to the exterior wall;
    a bulb having an exterior surface configured to transfer the vibrational energy to an object; and,
    wherein the base includes a coupling mechanism including a coupler cam and a coupler ring, wherein the coupler cam comprises a base portion and a top portion, wherein the base portion is configured to engage the coupler ring and the top portion includes a left finger and a right finger each having a plurality of cascading contact surfaces extending from the base portion.

\* \* \* \* \*